April 14, 1970 H. J. ANDERS 3,506,098
ANTINOISE DISK BRAKE
Original Filed Oct. 4, 1967 2 Sheets-Sheet 2

Hans J. Anders
INVENTOR.

BY Karl F. Ross
Attorney

United States Patent Office 3,506,098
Patented Apr. 14, 1970

BEST AVAILABLE COPY 3,506,098
ANTINOISE DISK BRAKE
Hans Joachim Anders, Frankfurt am Main, Rodelheim, Germany, assignor to Alfred Teves G.m.b.H., Frankfurt am Main, Germany, a corporation of Germany
Continuation of application Ser. No. 672,757, Oct. 4, 1967. This application May 5, 1969, Ser. No. 822,059
Claims priority, application Germany, Oct. 6, 1966, T 32,203
Int. Cl. F16d 55/228
U.S. Cl. 188—73                              7 Claims

ABSTRACT OF THE DISCLOSURE

A disk-brake system having noise-suppressing means constituted by a force-transmitting plate with the outline of and coextensive with the backing plate of the brakeshoe. The plate is interposed between a hydraulically shiftable piston of a wheel-brake cylinder and this backing plate. The plate is provided with an elongated embossed ridge turned toward the piston and engageable by a surface thereof parallel to the plates and of a length exceeding the diameter of this surface. The ridge or protuberance is radially offset outwardly from the axis of the wheel-brake cylinder (with reference to the center of the disk) and lies in a horizontal plane parallel to the wheel-brake cylinder axis.

---

This is a continuation of Ser. No. 672,757 filed Oct. 4, 1967, now abandoned.

My present invention relates to a disk-brake arrangement provided with means for reducing the noise generated upon application of the brake.

In the commonly assigned copending application Ser. No. 601,013, filed Dec. 12, 1966 by Ernst Meier and Hermann Seip, now Patent No. 3,409,106, there is described and claimed an antisqueal disk brake which is designed to overcome a problem arising in certain kinds of disk brake. In that application, it is pointed out that disk brakes, particularly those with a U-shaped yoke or chordal housing supported by one lobe or flange, have a tendency to generate squeal-like noises upon actuation of the brake and are characterized by uneven wear of the brake linings. Generally the lobes of the brake caliper straddle a disk which is keyed to (i.e. rotatably entrained by) the shaft and carry lined brakeshoes usually actuated by pistons or like pressure or force-transmitting members. The linings of these shoes are subjected to unequal abrasive forces when, in the course of the normal use, they clamp the rotating disk between them. The peripheral speed of the portions of the disk increases with the radius and, accordingly, the wear of the lining is greater toward the outer periphery; moreover, the cantilever shape or the one-sided support of the housing almost inevitably results in distortion and a spreading of the lobes with a consequent change in the attitude of attack of the linings of the disk. It has been found that brakes in which the lining assumes a wedge-shape as a result of this difference in wear, produce squealing noises as the brakeshoe becomes canted with respect to the surface of the piston during use. Since the cylinder is relatively firmly aligned in the cylinder walls, it is unable to conform to the position of the brakeshoe with the result that the zone of contact is no longer a surface but approaches a random point whose location may change with the degree and location of the wear. This permits oscillation of the brakeshoe within the limits of its clearances within its guide with the point of contact as a center of vibration. The squealing noises produced by disk brakes have been attributed to this arrangement.

In the aforementioned copending application, it is pointed out that the squealing noises can be reduced or eliminated by cutting away the piston of the fluid-responsive brake-actuating mechanism so that the piston bears upon the backing plate of a brakeshoe only over a limited off-center region of this piston corresponding to a segment of its cross-section. In that system, moreover, the pistons are so located in the lobes of the brake yoke or housing that the piston in the supported lobe, i.e. the lobe whose flange is secured to the axle housing, is situated downstream with respect to rotation of the brake disk (which is keyed or otherwise affixed to the axle of the wheel) and has a contact point at a greater radial distance from the axis of the disk than the other piston, i.e. the piston in the cantilevered or unsupported lobe. This other piston is located upstream with respect to rotation of the disk and has a contact point at a lesser radial distance. In other modifications described in that application, a plurality of steps are milled into the face of the piston bearing upon the backing plate of the brakeshoe.

It has been found that structures of this latter type while highly effective to reduce squealing of the disk brakes whose brake yokes are cantilevered to a support on the vehicle, are of relatively complex and expensive manufacture and cannot always be used when conventional brake assemblies are to be modified to reduce noises.

It is, therefore, the principal object of my invention to provide a low-noise disk brake of the general character described, which is of less expensive manufacture, is of greater simplicity and is highly effective by comparison with systems in which the brake piston must be milled or otherwise altered to shift the contact point with the backing plate of the brakeshoe.

Another object of this invention is to provide a brake assembly designed to reduce the squealing noises of disk brakes and which may be adapted from conventional brake structures without modification of the piston.

Still another object of my invention is to provide means of low manufacturing cost and a considerable capability for seriatim or mass production for reducing the squeal and other noises of a disk brake.

I have now found that these objects can be attained without difficulty by interposing between a planar face of a conventional wheel-brake piston member parallel to the braking surface of the disk and the backing-plate member of the respective brakeshoe, which also lies in a plane parallel to the braking face of the disk, a thin, sheet-metal intermediate force-transmitting plate embossed with a protuberance engaging one of these members while a flat surface of this plate along the side thereof opposite the protuberance, rests against the other member. Advantageously, the protuberance pressed into the plate is elongated and of an axial length exceeding the diameter of the wheel-brake piston thereon, while having its longitudinal axis lying in a plane perpendicular to the braking face of the disk, the backing plate of the brakeshoe and the contact face of the piston and yet parallel to the axis of the latter and the wheel-brake cylinder.

According to another feature of this invention, the intermediate plate which can have an outline and configuration corresponding to that of the backing plate of the brakeshoe, is provided with a protuberance in the form of an elongated oval whose longitudinal axis is offset laterally outwardly (with respect to the axis of the brake disk) from the axis of the piston and the wheel-brake cylinder. This system is of simple manufacture and can be produced by a combined stamping and press-embossment of sheet-metal workpieces. The transverse width of the embossment is preferably a minor fraction of the axial length thereof. A ratio of length to width of 3:1 to 10:1 is preferred.

The above and other objects, features and advantages of the present invention will become more readily apparent from the following description in which.

Figure 1:
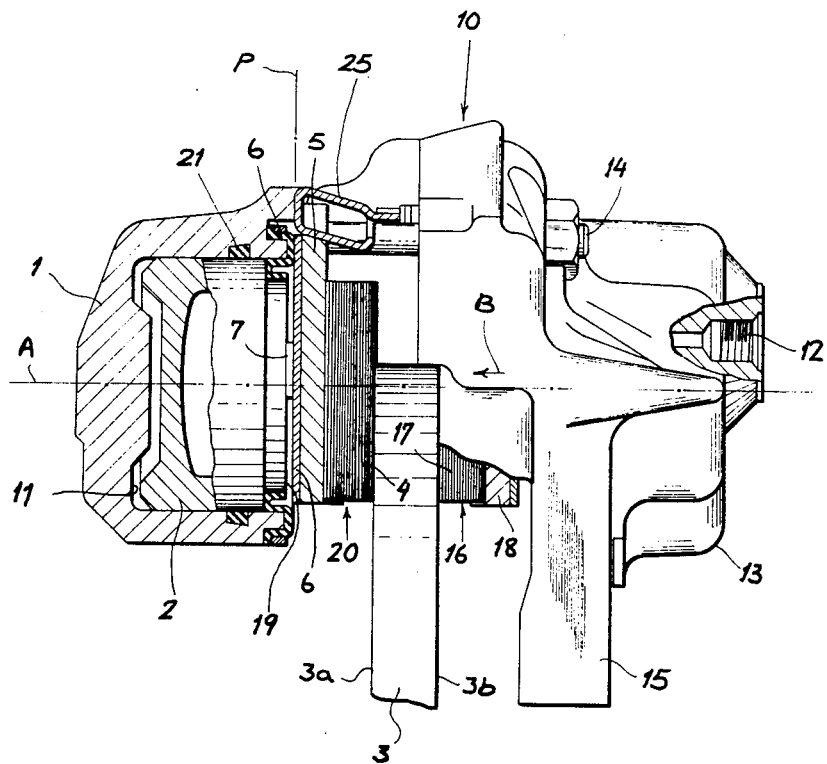
FIG. 1 is a side-elevational view, partly in axial cross-section, illustrating principles of the present invention.

In FIG. 1, I show a disk brake whose housing 10 is a yoke having a cantilevered or nonsupported yoke half 1 forming a wheel-brake cylinder 11 which is supplied with brake fluid from a master cylinder of the vehicle, e.g. via the port 12 as illustrated here for the right-hand brakeshoe. The other lobe 13 of this housing, which is secured to the unsupported lobe 1 by bolts 14, is formed with a flange 15 by means of which the brake yoke 10 is affixed to the axle housing of a motor-vehicle wheel. The yoke 10 extends around the periphery of a brake disk 3 whose axis of rotation (not shown) extends perpendicularly to the braking faces $3a$ and $3b$ of the disk and parallel to the axis A of the wheel-brake cylinders. The right-hand lobe of the brake has a brakeshoe 16 whose lining 17 confronts the braking surface $3b$ of the disk and is bonded to a backing plate 18 against which the respective wheel-brake piston bears to urge the brakeshoe 16 axially in the direction of arrow B into contact with the disk.

In the unsupported lobe 1 of the disk brake, a piston 2 is axially shiftable and has a contact face 19 designed to apply pressure to the backing plate 5 of a brakeshoe 20 whose lining 4 is thus applied to the braking face $3a$ of disk 3. The piston 2 is slidably engaged by a seal 21 in the wall of cylinder 11 to prevent brake fluid from escaping from the cylinder where an annular cap 22 engages the abutment end of this piston to prevent dust from entering the region between the piston and the cylinder wall.

Figure 3:
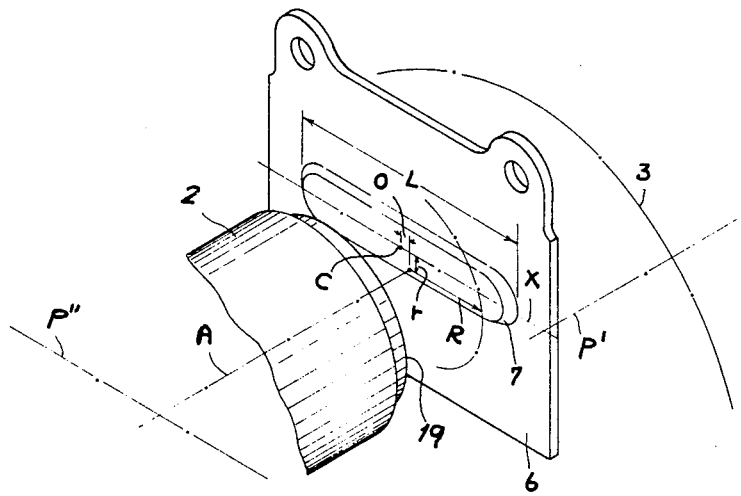
FIG. 3 is a perspective view showing the relationship between the actuating piston and the embossment of the intermediate plate.
Figure 4:
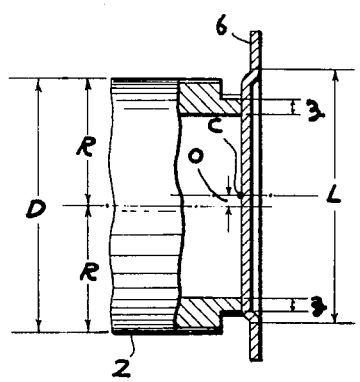
FIG. 4 is a cross-sectional view through the plate.
Figure 2:
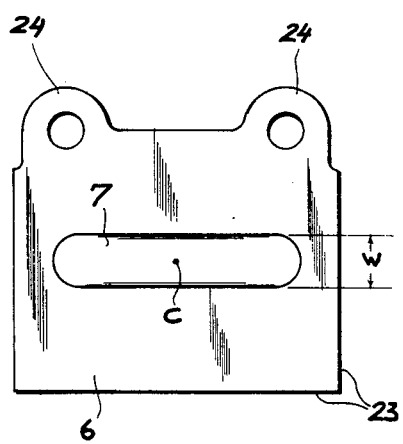
FIG. 2 is an elevational view of the intermediate plate of this invention.

Referring now to FIGS. 2–4, it can be seen that the present invention provides an intermediate plate 6 whose outlines 23 correspond to those of the backing plate 5, which is interposed between the brakeshoe 20 and the piston 2, this intermediate force-transmitting plate having a pair of lugs 24 corresponding to similar lugs of the backing plate 5 and slidably receiving guide pins by the yoke in the usual manner. Clips 25 may be used to retain the intermediate plate 6 and the brakeshoes against radial outward movement until it is desired to replace the plates and/or the brakeshoes. The surface 19 lies in a plane P parallel to the plane of the force-transmitting plate 6 and confronts the embossed ridge 7 which is engaged (in line contact) by the piston 2 at zone z FIG. 4). The centroid C of the oval protuberance 7 is offset from the axis A of the piston 2 by a distance r radially outwardly with respect to the axis of rotation of the disk which is represented at dot-dash lines in FIG. 3. In addition, a lateral offset o can be provided (as shown in FIG. 4) in accordance with the principles of the earlier application. As is also evident from FIGS. 3 and 4, the diameter D of the surface 19 of the cylindrical piston is less than the length L of the oval protuberance 7 so that $L > 2R$ and it may be seen that the length L of the protuberance is equal to 3 to 10 times the width W thereof. The longitudinal axis X of the protuberance 7 lies in a horizontal plane P' parallel to the horizontal axial plane P'' of the piston 2 and is offset therefrom as indicated earlier. It has been found that the sheet-metal plate, which can be stamped from a larger body of sheet metal and embossed with the ridge 7 in a single operation, can be inserted in conventional brake systems since it can have a thickness of the order of centimeters or less and serves to eliminate the squealing noises described earlier.

Moreover, the same plate may be used for the left-and right-hand side of dual-cylinder brakes, may be used without special measurement for a wide variety of piston diameters assuming a ridge 7 of sufficient length, etc.

I claim:

1. A disk-brake system comprising a rotatable brake disk, a yoke disposed along the periphery of said disk and having a cylinder with an axis perpendicular to the braking face of said disk, a brakeshoe member mounted in said yoke and confronting said face of said disk, and at least one brakeshoe-guide pin spanning said yoke, said brakeshoe member being slidably mounted on said pin and being formed with a backing plate remote from said disk and a brake lining secured to said backing plate and confronting said disk, a piston member shiftable in said cylinder for urging said brakeshoe member against said face, and having a surface lying in a plane generally parallel to said backing plate and perpendicular to said axis, and noise suppressing means incluuding a force transmitting plate of sheet metal interposed between said members and removably mounted in said yoke slidably on said pin independently of said brakeshoe member, said force-transmitting plate being formed with a narrow elongated protuberance embossed in said force-transmitting plate and engaging said surface of said piston member while bearing upon the backing plate with a flat side of the force-transmitting plate opposite said protuberance, said protuberance having a longitudinal axis lying in a plane parallel to said axis of said cylinder and perpendicular to said face, said force-transmitting plate being free from engagement with said backing plate except for surface contact along said flat side and having a recess coextensive with said protuberance and facing said backing plate.

2. The disk-brake system defined in claim 1 wherein said longitudinal axis of said protuberance is offset radially outwardly from said axis of said cylinder with respect to the center of rotation of said disk, said protuberance having a height approximately the thickness of said force-transmitting plate.

3. The disk-brake system defined in claim 2 wherein said piston member is generally cylindrical and said surface of said piston member is centered on the axis of said cylinder, said protuberance having a length exceeding the diameter of said piston member at said surface thereof.

4. The disk-brake system defined in claim 3 wherein the longitudinal axis of said protuberance lies in a plane parallel to a horizontal axial plane of said cylinder.

5. The disk-brake system defined in claim 4 wherein said protuberance has an axial length ranging from 3 to 10 times the width of the protuberance.

6. The disk-brake system defined in claim 4 wherein said force-transmitting plate has an outline corresponding to, and is substantially coextensive with, said backing plate with edges flush therewith.

7. The disk-brake system defined in claim 4 wherein said piston member contacts said protuberance at a contact interface having a centroid offset from said axis of said cylinder.

References Cited

UNITED STATES PATENTS

| 2,926,757 | 3/1960 | Armstrong | 188—73 |
| 2,953,221 | 9/1960 | Lucien | 188—73 |
| 3,113,643 | 12/1963 | Botterill | 188—73 |
| 3,298,468 | 1/1967 | Buyze | 188—73 |

FOREIGN PATENTS 260,807   7/1965   Australia.

GEORGE E. A. HALVOSA, Primary Examiner

U.S. Cl. X.R.

188—1, 205